Figure 1:
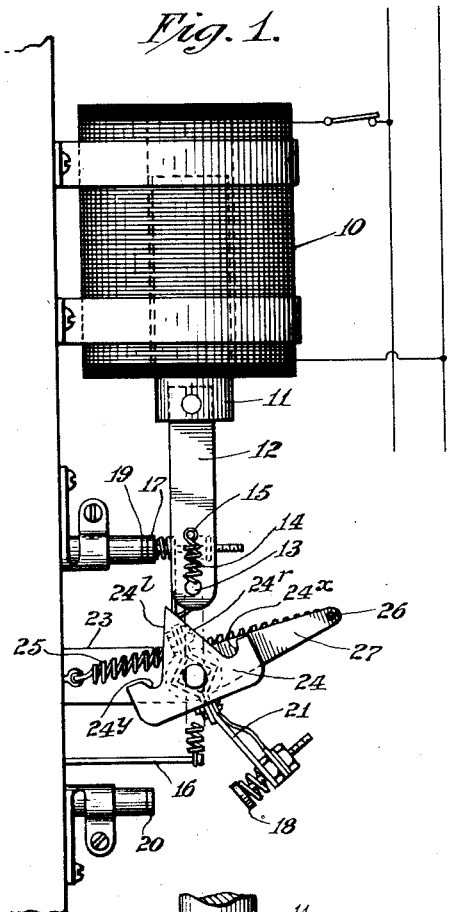

July 10, 1934.   W. DEANS   1,966,285
ELECTRIC SWITCH AND SPECIAL APPLICATION THEREOF
Original Filed April 26, 1930   3 Sheets-Sheet 1

William Deans
INVENTOR.

BY W. B. Whitney
ATTORNEY

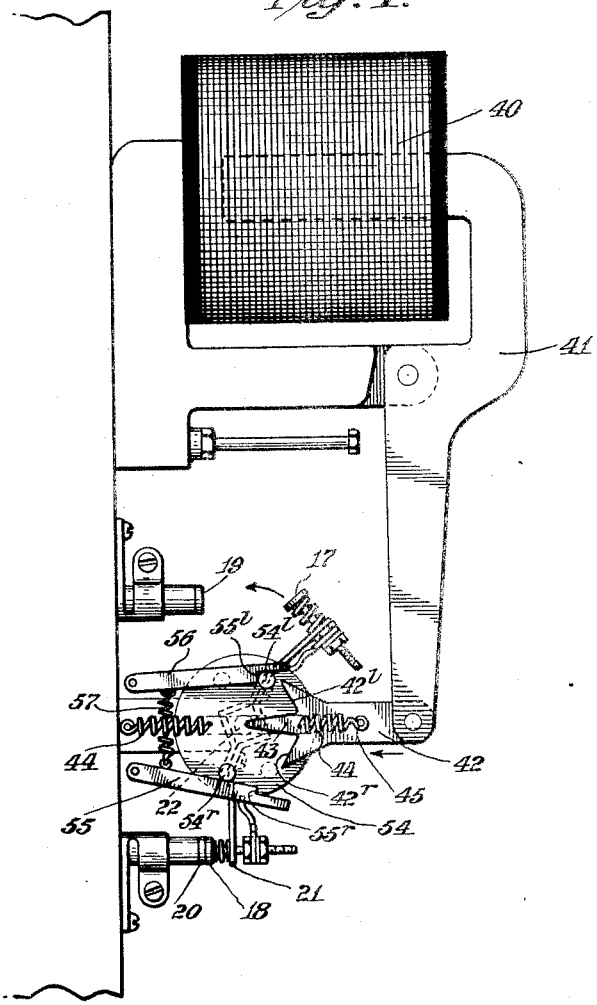

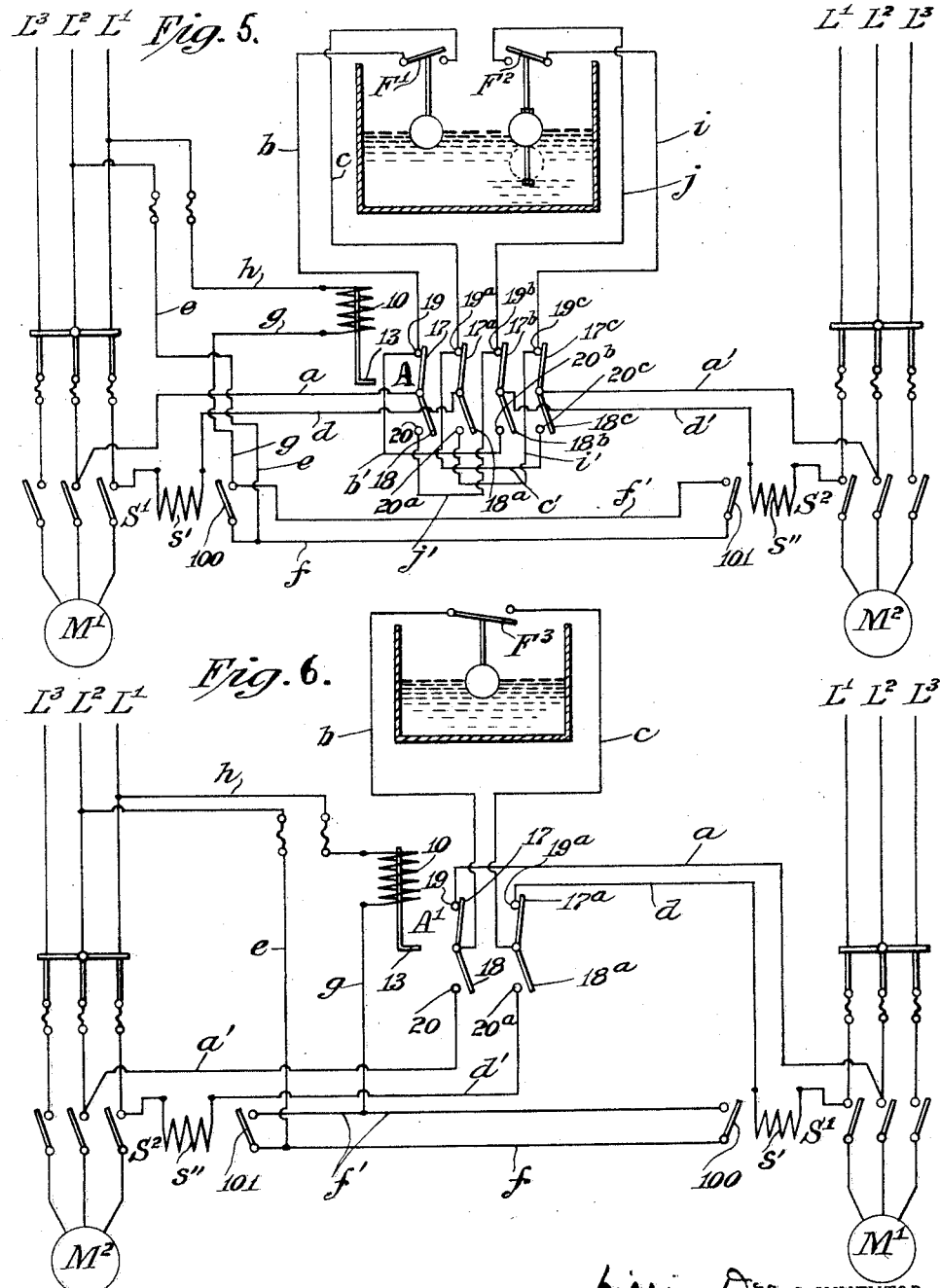

Patented July 10, 1934

1,966,285

UNITED STATES PATENT OFFICE 1,966,285

ELECTRIC SWITCH AND SPECIAL APPLICATION THEREOF

William Deans, Ridgewood, N. J., assignor, by mesne assignments, to The Clark Controller Company, Cleveland, Ohio, a corporation of Ohio Original application April 26, 1930, Serial No. 447,440. Divided and this application February 20, 1932, Serial No. 594,241

12 Claims. (Cl. 172—239)

The present invention relates to an automatic double-throw alternator switch; and the primary object thereof is to provide a simple and efficient switch of this type in which the position of the contacts of a single pole, or of a plurality of poles, will not be affected by the energization of an electromagnet but will be closed alternately on the successive de-energization of the magnet, or vice versa.

This object I attain by a novel operative connection between the magnet and a rock-shaft carrying the double-throw contacts of the switch which comprises, broadly, a member carried by the armature or movable member of the magnet to reciprocate therewith normally and yieldingly in a path intersecting the axial line of the rock-shaft and a second member fixed to said shaft and so disposed and shaped that a surface or part on one side of its axis will lie in the normal path of travel of the first member and will be operatively engaged and rocked in one direction by said first member on its advance movement, thereby closing one set of the switch contacts and in so doing deflecting the first member somewhat from and bringing a similar surface or part on the opposite side of its own axis into the normal path of the first member, there to remain on the withdrawal of the first member and be operatively engaged and rocked in the opposite direction on the next advance movement of the first member.

While not limited as to the field of its utility, my new alternator switch is particularly adapted for use in connection with a motor-driven duplex pumping or similar apparatus where it is desired to operate the apparatus alternately, or in alternate sequence, and to such end I have provided the circuit connections whereby a circuit controlled by a float, pressure, or like switch will be connected through one set of contacts of a double-pole alternator switch with the starting circuit of one of two motors and through the second set of its contacts with the second motor, in such manner that the position of these contacts will not be affected by the starting up of the motors but on the stopping of either motor the alternator switch will be actuated to place the starting circuit of the other motor under the control of the float or like control switch, and a circuit controlled by a second float or like control switch will in like manner be alternately connected with the two motors through the contacts of the two additional poles of a four-pole alternator switch so that the motors will, if required, operate together in alternate sequence.

The invention will be fully understood from the following detailed description taken in connection with the accompanying drawings, in which—

Figure 2:
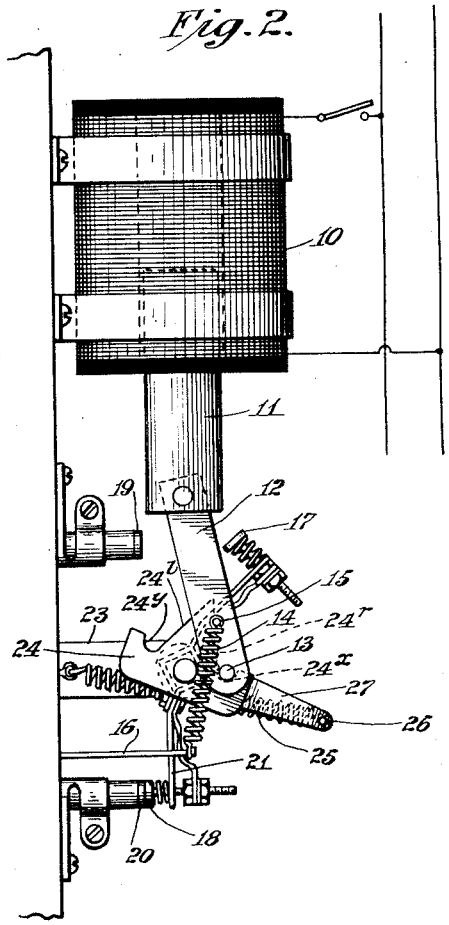
Figure 3:
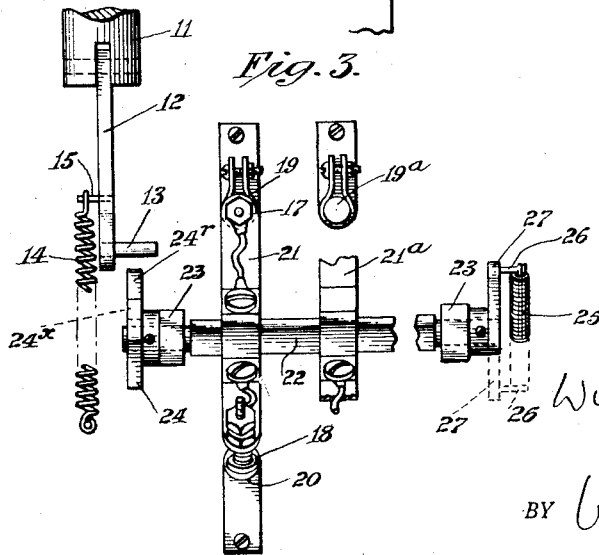

Figure 1 is an end elevational view of an alternator switch illustrating one practical embodiment of my invention, the magnet of the switch being shown as energized and the parts of the switch in position with the upper contacts closed; Fig. 2 is a view similar to Fig. 1 but showing the switch with its magnet de-energized and its parts in the position to which they have been shifted thereby; Fig. 3 is a fragmentary view, in front elevation, of parts of the switch in the position in which they are shown in Fig. 1; Fig. 4 is a view, similar to Fig. 1, illustrating an embodiment in modified form of the invention; Fig. 5 is a diagrammatic view of a typical duplex motor system in which the circuits of the two motors are connected up for control by two float switches through a four-pole alternator switch; and Fig. 6 is a similar view of a modified system in which the two motors are controlled through a two-pole alternator switch by a single float switch.

Referring first to the alternator switch shown in Figs. 1–3 of the drawings, the switch-actuating magnet 10, of the solenoid type, is mounted upon the usual panel; and within the slotted lower end of its armature 11 is pivotally mounted the member 12, which carries fixed in its rounded free end and projecting to one side thereof an actuating pin 13. The spring 14, which is attached at one end to a pin 15 set into the opposite side of the member 12 slightly above pin 13 and at its other end to a post 16 fixed to the panel, serves to yieldingly hold the member 12 in longitudinal alignment with the axis of the armature and also, as it is put under increased tension when the armature is raised on the energization of the magnet, supplements gravity in drawing the armature downwards when released on the de-energization of the magnet. The upper and lower movable switch contacts 17 17$^a$ and 18 18$^a$ (17 and 18 only being shown), operatively related to upper and lower fixed contacts 19 19$^a$ and 20 20$^a$ (the latter not shown) fixed to the panel, are carried, resiliently mounted thereon as shown, at the opposite ends of one or more elbow pole-pieces 21 21$^a$ which are clamped or otherwise suitably secured in place upon a rock-shaft 22, of insulating material, which rock-shaft is journaled at its ends in bearings in supports 23 23 fixed to the panel and so positioned thereon that a projection of the axis of the shaft will intersect the projected axis of the armature and one of such ends will adjoin that side of the member 12 from which projects the pin 13. To this end of the rock-shaft there is fixed, outside the bearing, the rock-lever 24, of a more or less inverted T-shape, with oppositely inclined cam edges 24$^r$ 24$^l$ which intersect at their outer ends to thereby convert the central upward projection of the lever into a double wedge and terminate at the base of this wedge in rounded shoulders 24$^x$ 24$^y$. The rock-lever is so positioned upon the shaft that when the upper switch contacts are closed the cam edge 24$^r$ of the lever will lie in the normal path of travel of the pin 13, as shown in Fig. 1, and when the shaft has been rocked to open the upper and close the lower switch contacts the cam edge 24$^l$ will have been shifted into the normal path of travel of the pin. A second spring 25, which is attached at one end to the panel and at the other end to a pin 25 set into the end of an arm 27 so fixed to the opposite end of the rock-shaft as to bisect the angle between the two arms of the pole-pieces 21 21$^a$, is first tensioned by the rocking of the shaft and then, as the pin on the arm passes the center of the arc of the circle through which it moves, assists in completing the rocking movement of the shaft and yieldingly locks in closed position whichever set of switch contacts have been closed thereby.

The operation of the switch, as is obvious, is as follows: Assuming that the coil of the magnet is energized and hence that the parts of the device are in the position shown in Fig. 1 of the drawings, on the opening of the circuit of the magnet coil, the armature drops by gravity supplemented by the pull of spring 14 and the pin 13 engages and slides along the cam edge 24$^r$ of the rock-lever, swinging the free end of member 12 out of its normal path of travel, until it reaches the shoulder 24$^x$ and then rocks the lever and with it the rock-shaft 22 and the parts carried thereon, in a counter-clockwise direction as viewed in Fig. 1, to first open the upper contacts 17 and 19, put the spring 25 under increased tension and then, assisted by spring 25 after the latter has been carried past center, to close the lower contacts 18 and 20, thereby bringing the parts of the device into the position in which they are shown in Fig. 2. When the magnet is again energized by the closing of the circuit through its coil, the armature and member 12 are drawn up against the action of the spring 14 which swings the member back into its normal path with pin 13 extending above the cam edge 24$^l$, while nothing happens to the switch proper since its lower contacts are held yieldingly locked in closed position by spring 25. Hence, when the magnet is next de-energized there is the same sequence of operations as before but the action on the switch contacts is reversed, the pin 13 now engaging the cam edge 24$^l$ of the rock-lever and on reaching the shoulder 24$^y$ rocking the shaft, in a counter-clockwise direction, to open the lower and close the upper switch contacts, which, also as before, are held in position by the spring 25 when the magnet is again energized. The cycle of operations thus completed is then repeated, with the result that the two sets of switch contacts are opened and closed alternately on successive de-energizations of the magnet and are in no way affected by the energization of the magnet.

In the modified form of the switch shown in Fig. 4, the magnet 40 is of the clapper type, and the free end of the member 42 which is pivotally mounted within the slotted tail of the armature 41, instead of carrying an actuating pin, is taperingly widened and slotted to form a central projection 43 and two lateral projections with inner inclined cam edges 42$^r$ and 42$^l$, and, as before, is yieldingly held in normal operative position by the spring 44 fixed at one end to a pin 45 set into the member and at its other end to the panel. The co-operating member 54, which in place of the former rock-lever is fixed on the adjacent end of the rock-shaft 22, is in the form of a disk and carries set therein, on opposite sides of its axis, pins 54$^r$ and 54$^l$ which project therefrom into the path of travel of the cam edges of the member 42. And here, as a substitute for the contact locking spring of the switch first described, there are provided two lock members 55 and 56 which at one end are pivotally supported upon the panel, at their free ends are cut away on their inner edges to provide shoulders 55$^r$ and 56$^l$ operatively related to the pins 54$^r$ and 54$^l$ respectively, and are connected and yieldingly drawn towards each other by a light spring 57.

The operation of the modified switch is substantially the same as of that already described. Thus, starting with the device in the position shown, when the magnet is de-energized the armature is rocked on its pivot, by gravity supplemented by the pull of spring 44, and the member 42 is thrust back towards the panel with the result that the cam edge 42$^l$ engaging pin 54$^l$ slides thereon and swings the free end of member 42 upwardly to thereby push back the lock member 56 and withdraw its shoulder from behind the pin and then, when the bottom of the slot reaches the pin, the disk and with it the rock-shaft are rocked to open the lower contacts 18 and 20 and close the upper contacts 17 and 19, the pin 54$^r$ being at the same time moved forwardly until the shoulder on lock member 55 can spring behind it to lock the rock-shaft and switch contacts in the position into which they have thus been shifted. On the energization of the magnet the member 42 is drawn forward against, and positioned as before, by the tension of spring 44; and when the magnet is again de-energized the cam edge 42$^r$ and the bottom of the slot in which it ends successively engage pin 54$^r$, to first unlock and then rock the rock-shaft to open the upper contacts 17 and 19 and close the lower contacts 18 and 20, and these parts are again locked in position by the engagement of the shoulder 56$^l$ with the pin 54$^l$.

Referring now to the duplex motor system illustrated in Fig. 5, M$^1$ and M$^2$ designate the two motors, S$^1$ and S$^2$ designate the starters by which the motors are respectively connected with the line wires L$^1$ L$^2$ and L$^3$, F$^1$ and F$^2$ designate two float switches, and A designates a four-pole double-throw alternator switch through which the actuating circuits of the motor starters are controlled by the float switches. The control circuit connections and the operation of the system are as follows: With the contacts of the alternator switch A locked in the position shown, the closure of float switch F$^1$, on a drop of the fluid in a tank as shown, establishes a circuit from line wire L$^2$ of motor M$^1$ by wire $a$, upper contacts 17 and 19 of alternator switch A, wire $b$, contacts of float switch F$^1$, wire $c$, upper contacts 19$^a$ and 17$^a$ of alternator switch A, and wire $d$ through the magnet coil $s'$ of motor starter S$^1$ to the line wire L$^2$. Starter S$^1$ is thereupon actuated to connect motor M$^1$ to the line and thereby start that motor; and in so doing closes auxiliary switch 100 and so establishes a circuit between the same line wires L$^2$ and L$^1$ by wires e and f, switch 100, and wires g and h through the coil of magnet 10 of the alternator switch, which magnet thus energized raises its armature without, as seen, affecting the position of the switch contacts and continues to hold the armature raised so long as motor M¹ is running. If and when float switch F² is closed, as on a further drop of the fluid in the tank, starter S² will be actuated, to start motor M², by the establishment of a circuit between the line wires L² and L¹ of this second motor by wire a', upper contacts 17ᶜ and 19ᶜ of alternator switch A, wire i, contacts of float switch F², wire j, upper contacts 19ᵇ and 17ᵇ of alternator switch A, wire d' through the magnet coil s'' of the starter. With both motors running, a rise of the fluid in the tank will first open float switch F², thereby breaking the circuit through the magnet coil of its starter and stopping motor M², and later will open float switch F¹ to break the circuit through the magnet coil of starter S¹ and not only stop the motor M¹ but also, by the opening of auxiliary switch 100, break the circuit of and de-energize the magnet 10 of the alternator switch, the effect of which, as hereinabove described, is to shift the contacts of this switch, the upper to open and the lower to closed position. The circuit connections between the float switches and the starters of the two motors have now been reversed. Hence, when float switch F¹ is again closed motor M² will be started by the actuation of its starter, through the circuit established between its line wires L² and L¹ by wire a¹, lower contacts 18ᶜ and 20ᶜ of alternator switch A, wires c' and c, contacts of float switch F¹, wires b and b', lower contacts 20ᵇ and 18ᵇ of alternator switch A, and wire d' through the magnet coil s'' of its starter, and at the same time auxiliary switch 101 will be closed and again establish the circuit of and energize magnet 10 of the alternator switch without affecting the position of its contacts; and now motor M¹ will be started in sequence on closure of float switch F² and the establishment thereby of a circuit between line wires L² and L¹ of that motor by wire a, lower contacts 20 and 18 of alternator switch A, wires j' and j, contacts of float switch F², wires i and i', lower contacts 20ᵃ and 18ᵃ of alternator switch A, and wire d through the magnet coil s' of its starter. On the next succeeding opening of the float switches motor M¹ and M² will be stopped in that sequence, and with the stopping of motor M² auxiliary switch 101 will be opened, magnet 10 of the alternator switch A will be de-energized, and the contacts of that switch will again be shifted, the upper back to closed and the lower back to open position, for a repetition of the cycle of operations described.

As illustrated in Fig. 6, the starters of the two motors are controlled, to start the two motors alternately but not to operate them both at the same time, by a single float switch F³, here shown as closed and opened by the rise and fall respectively of the fluid in a tank, through a two-pole double-throw alternator switch A¹. For this simplified operation, the circuit controlled by the float switch is connected through the upper contacts of the alternator switch with the starter circuit of motor M¹—by wire a, contacts 19 and 17, wire b, contacts of float switch F³, wire c, contacts 17ᵃ and 19ᵃ, and wire d through the magnet coil s' of starter S¹—and with the starter circuit of motor M² through the lower contacts of the alternator switch—by wire a', contacts 20 and 18, wire b, contacts of float switch F³, wire c, contacts 18ᵃ and 20ᵃ, and wire d through the magnet coil s'' of the starter S²; and associated respectively with the two motor starters are the same two auxiliary switches 100 and 101 by means of which the circuit of the magnet 10 of the alternator switch is closed to energize that magnet whenever either motor M¹ or motor M² is started, and, on the stopping of whichever motor has been started, is opened to de-energize the magnet 10 and thereby effect a shift in the position of the contacts of the alternator switch.

While I have explained the principle of my invention in connection with the forms I now consider best for the practical embodiment thereof, it is to be understood that the invention can be further variously modified in its several details, within the scope of the appended claims, without departing from the spirit or sacrificing the substantial advantages thereof.

This application is a division of application Serial No. 447,440, filed April 26, 1930.

What I claim as new, and desire to secure by Letters Patent, is—

1. In a motor control system, the combination of two motors with starters associated therewith, a control switch, an electromagnetically actuated plural-pole double-throw control switch, circuit connections operatively connecting the circuit of the control switch to the actuating circuit of the starter of one motor through contacts on one side and to the actuating circuit of the starter of the second motor through contacts on the opposite side of the double-throw switch, means operative to energize the actuating magnet of the double-throw switch when either motor is started and to de-energize it when and only when the motor then running is stopped, said double-throw switch having means operatively connecting its actuating magnet and contacts whereby on successive energizations of the magnet the contacts will alternately be shifted, first the contacts on one side to open and the contacts on the other side to closed position and then the contacts on the second side to open and the contacts on the first side to closed position, and will not be affected by the energizations of the magnet.

2. In a motor control system, the combination of two motors with starters associated therewith, two control switches adapted to be closed one after the other and to be opened in reverse sequence, an electromagnetically actuated four-pole double-throw switch, circuit connections operatively connecting one control switch with each of the two motor starters, one switch with one motor starter through the upper contacts of the first two poles and to the second motor starter through the lower contacts of the second two poles of the double-throw switch and the other control switch to the second motor starter through the upper contacts of the second two poles and to the first motor starter through the lower contacts of the first two poles of the double-throw switch, means operative on the starting of the motor first started to energize the actuating magnet of the double-throw switch and to de-energize it when and only when the same motor is stopped, said double-throw switch having means operatively connecting its actuating magnet with its contacts whereby on successive energizations of the magnet the contacts will be shifted first to open one set and close the other set of contacts and then to open the first and close the second set of contacts and so on alternately and will not be affected by the energization of the magnet.

3. In a motor control system, the combination of two motors with electromagnetically controlled starters associated therewith, a control switch, a plural-pole double-throw switch with contacts biased to closed position on one or the other side thereof, control circuits operatively connecting the control switch with the starter of one motor through contacts on one side and to the starter of the second motor through contacts on the opposite side of the double-throw switch, and means controlled by the starters of the two motors respectively, whereby the stopping of whichever motor has been started will shift the contacts on the opposite side of the double-throw switch from closed to open and from open to closed position respectively.

4. In a motor control system, the combination of two motors with electromagnetically controlled starters associated therewith, two control switches adapted to close one after the other and to open in reverse sequence, a plural-pole double-throw switch with contacts biased to closed position on one or the other side thereof, control circuits operatively connecting one control switch with each of the two motor starters, one switch with one motor starter through two of the upper contacts and to the second motor starter through two of the lower contacts of the double-throw switch and the other control switch to the second motor starter through two other upper contacts and to the first motor starter through two other lower contacts of the double-throw switch, and means controlled by the starters of the two motors respectively for shifting the contacts of the double-throw switch from closed to open and from open to closed position respectively on the stopping of whichever of the two motors has been started.

5. In a motor control system, the combination of a plurality of motors, means including electric circuits and a plural-pole double-throw switch for controlling the operation of said motors, and means operative on the stopping of whichever motor has been started by the closing of its circuits through the switch to automatically effect a shifting thereof to close the circuits of another motor.

6. In a motor control system, the combination of a plurality of motors, means including a control switch, a plural-pole double-throw switch and electric circuits for controlling the operation of said motors, and means for actuating the double-throw switch operative on each operation of the control switch to effect a shifting thereof to open the circuits of one and to close the circuits of another of said motors.

7. In a control system, the combination of a plurality of translating devices, means including electric circuits and a plural-pole double-throw switch for controlling the operation of said translating devices, and means operative on the stopping of whichever translating device is being operated by the closure of its circuits through the switch to automatically effect a shifting thereof to close the circuits of another translating device.

8. In a control system, the combination of a plurality of translating devices, means including a control switch, a plural-pole double-throw switch and electric circuits for controlling the operation of said translating devices, and means for actuating the double-throw switch operative on each operation of the control switch to effect a shifting thereof to open the circuits of one and to close the circuits of another of said translating devices.

9. In a control system, the combination of a plurality of translating devices, means including a control device, an electromagnetically-actuated relay and electric circuits for controlling said translating devices, and means automatically actuated only on the deenergization of the actuating coil of the relay under control of the control device for shifting the control of the latter from one to another of said translating devices.

10. In combination, an electric circuit, a plurality of translating devices, a plurality of sequentially operable control devices for effecting the sequential connection and disconnection of said translating devices to and from said circuit, and means controlled by said control devices for automatically changing when the last translating device is disconnected from said circuit the order in which said translating devices are operated by the sequential operation of said control devices.

11. In combination, an electric circuit, a plurality of translating devices, control means for effecting the connection and disconnection of one of said devices to and from said circuit, other control means for effecting the connection and disconnection of another of said devices to and from said circuit, and means controlled by said first mentioned control means for placing another of said translating devices under the control of said first mentioned control means and for placing said one of said devices under the control of said other control means after said first mentioned control means has effected the connection and disconnection of said one of said devices.

12. In combination, a plurality of automatic switching arrangements, each having a starting circuit, a control device normally arranged to control the energization of one of said starting circuits, a control relay controlled by said control device, other control means normally arranged to control the energization of another of said starting circuits, and means responsive to the energization and subsequent deenergization of said control relay for removing the control of said one of said starting circuits from said control device and for removing the control of said other starting circuit from the control of said control means and for placing it under the control of said control device.

WILLIAM DEANS.